United States Patent [19]

O'Connor

[11] Patent Number: 4,589,808
[45] Date of Patent: May 20, 1986

[54] POWER DRAW BAR

[75] Inventor: Charles A. O'Connor, E. Norwich, N.Y.

[73] Assignee: Lesnor Maehr Manufacturing Corp., Farmingdale, N.Y.

[21] Appl. No.: 671,924

[22] Filed: Nov. 16, 1984

[51] Int. Cl.[4] .......................... B23C 5/26; B23B 31/10
[52] U.S. Cl. ................................. 409/233; 408/239 A
[58] Field of Search ................... 409/233; 408/239 R, 408/239 A; 279/7, 8

[56] References Cited

U.S. PATENT DOCUMENTS

| 3,027,812 | 4/1962 | Courtois | 409/233 |
| 3,177,775 | 4/1965 | Alisauskis | 409/233 |
| 3,242,819 | 3/1966 | Erikson | 409/233 |
| 3,288,032 | 11/1966 | Pankonin et al. | 409/233 |
| 3,374,711 | 3/1968 | Saunders | 409/233 |
| 3,446,509 | 5/1969 | Colosimo | 279/7 |
| 3,568,566 | 3/1971 | Weldig | 409/233 |
| 3,791,257 | 2/1974 | Frazier et al. | 409/233 |
| 3,813,782 | 6/1974 | Niles et al. | 409/233 |
| 3,844,028 | 10/1974 | Hague et al. | 409/233 |
| 4,011,791 | 3/1977 | Lanzenberger | 409/233 |
| 4,135,848 | 1/1979 | Hughes et al. | 409/233 X |
| 4,226,562 | 10/1980 | Schmid et al. | 409/233 |
| 4,406,195 | 9/1983 | Kruger et al. | 408/239 A |
| 4,511,295 | 4/1985 | Razdobreev | 409/233 |

FOREIGN PATENT DOCUMENTS

| 23197 | 1/1981 | European Pat. Off. | 409/233 |
| 1390931 | 4/1975 | United Kingdom | 409/233 |

Primary Examiner—William R. Briggs
Attorney, Agent, or Firm—Albert F. Kronman

[57] ABSTRACT

An automatic draw bar for removably securing machine tools carried by a tool holder within the spindle of a milling machine or the like, in which the tool holder is formed with an internally threaded bore. The spindle is provided with an elongated bore having a recess at its end to receive the shank of the tool holder. A hollow draw bar is slidably carried within the spindle and is exteriorly threaded at one end with a thread engagable with the tool holder interior thread. An elongated draw bar expander slidably carried within the draw bar and responsive to a source of linear power is adapted to couple the threads on the draw bar and tool holder to draw the tool holder into frictional engagement with the spindle upon activation of the power source.

11 Claims, 3 Drawing Figures

POWER DRAW BAR

BACKGROUND OF THE INVENTION

Automatic draw bar mechanisms for removably securing machine tools within the spindles of milling machines, lathes, boring mills and the like are well known in the art. Prior art devices may be divided into nonrotating types in which the tool holder and the draw bar do not rotate with respect to each other during securing and ejecting operations and rotating types which do. Presently known nonrotating types require extensive modification of standard spindles of the machine so that the entire spindle must be replaced. In addition, special adaptors must be provided for each machine tool holder. Representative of these nonrotating types of draw bars are U.S. Pat. Nos. 3,177,775 and 3,242,819.

Rotating types of power draw bars, on the other hand, either require an expensive hydraulic motor or an electric motor with a complicated drive mechanism. Such power draw bars are disclosed in U.S. Pat. Nos. 3,027,812 and 3,374,711 and others.

Accordingly, it is an object of the present invention to provide a power draw bar which is readily adapted to standard milling machine spindles and the like.

Another object of the present invention is to provide a power draw bar which engages the normal internal threaded structure of standard tool holders without need for tool holder modification.

A further object of the present invention is to improve the useful life of both the tool holder and the draw bar over many cycles of engagement and ejection of tool holders.

An object of the present invention is to improve the safety of power draw bars by limiting the longitudinal traverse of the mechanism.

SUMMARY

A power draw bar made in accordance with the present invention is fitted into the through hole of a standard milling machine spindle. The spindle is provided with an internally tapered bearing surface at its free end to receive the tapered shank portion of the standard tool holder. Standard tool holders are also made with an internally threaded axial bore in the reduced end of the taper. An elongated draw bar having a longitudinal, axial bore therein is coupled to an air cylinder or similar reciprocating device for movement within the spindle through hole. The free end of the draw bar adjacent the tool holder receiving end of the spindle is externally threaded and longitudinally slotted. Within the draw bar bore there is carried a draw bar expander in the form of an elongated rod, the free end of which extends partially beyond the free end of the draw bar.

When the tool holder is slipped into the tapered end of the spindle, the free end of the draw bar extends into the internally threaded bore of said tool holder. The draw bar expander is then drawn into the draw bar. A tapered button on the end of the expander forces the slotted end of the draw bar apart until the external thread of the draw bar engage the internal threads of the tool holder. The draw bar and its expander are then moved longitudinally further into the spindle to secure the tool holder firmly in place. When it is desired to eject the tool holder, the operation is reversed.

BRIEF DESCRIPTION OF THE DRAWING

In the accompanying drawing forming part hereof similar elements have been given the same reference numerals. In the drawing.

DETAILED DESCRIPTION

Figure 1:
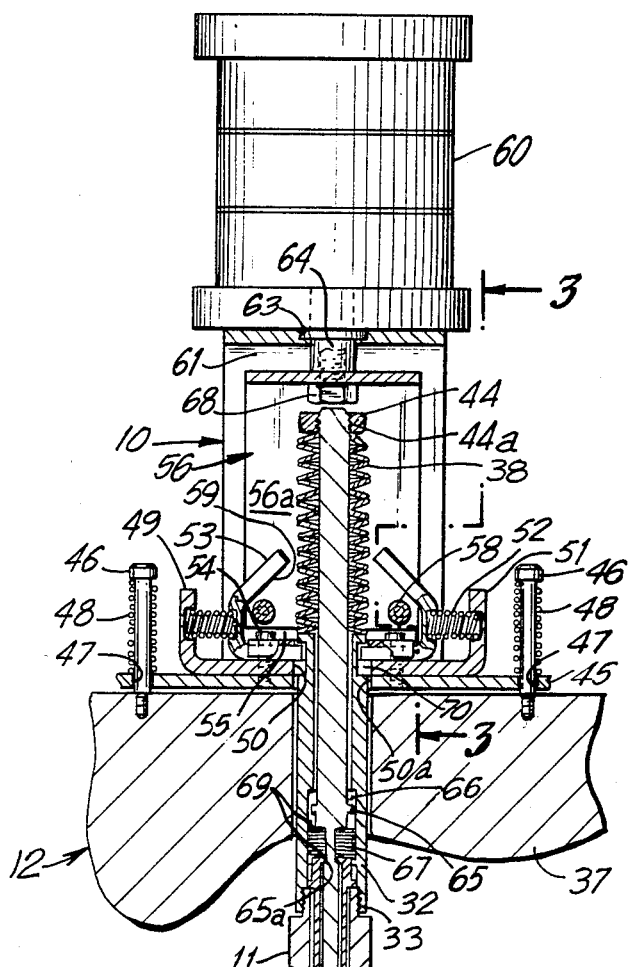
FIG. 1 is a view in longitudinal section of a complete embodiment of the present invention.

Referring to the drawing and particularly to FIG. 1, there is shown a power draw bar assembly 10 for securing a tool holder 13 within the spindle 11 of a metal cutting machine, such as a milling machine 12, drill press, or the like.

The tool holder 13 used in the present invention is of a type wellknown in the art. Such tool holders are provided with a chuck 14 to receive a cutting tool 15. The opposite end of the tool holder has a tapered shank 16 which is receivable within the hollow spindle 11 of the metal cutting machine. The tapered shank 16 is formed with a flange 19 located at the widest part of the said shank. A slotted portion 20 of the flange receives a key 21 depending from the spindle to prevent rotation of the tool holder with respect to the spindle.

Figure 2:
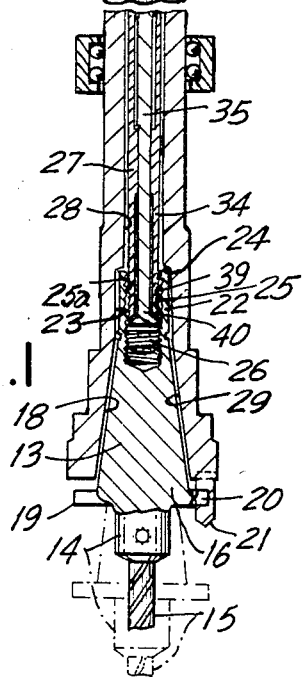
FIG. 2 is a fragmentary view in elevation, partly cut away, on an enlarged scale, of the tool holder engaging portion of the power draw bar.
Figure 3:
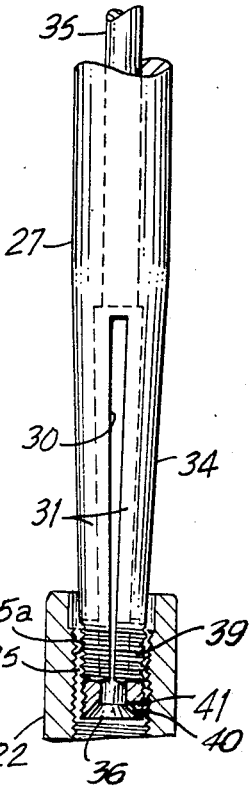
FIG. 3 is a sectional view taken on line 3—3 in FIG. 1, looking in the direction of the arrows.
Figure 3:
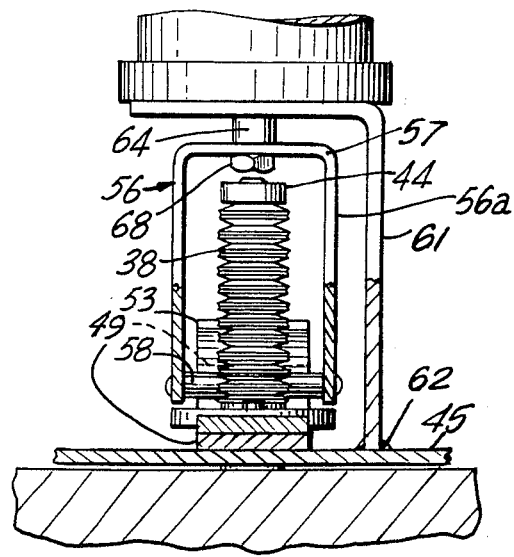

The end 22 of the tapered shank 16 opposite the flange 19 is cylindrical, axially bored and internally threaded as best shown at 25 and 25a in FIG. 2. The internally threaded bore is fitted with a stop screw 26 for a hereinafter described purpose. The stop screw is adjustable within the threaded bore 25.

As shown in FIG. 1, the spindle 11 of the power draw bar assembly is longitudinally and axially bored to provide a through hole 28 of a diameter to slidably receive the draw bar 27 of the present invention. A tapered socket 18 is machined in the tool holder receiving end of the spindle and is of a shape to form a tight frictional fit with the tapered portion of the tool holder as is wellknown in the art.

The through hole 28 of the spindle 11 may be stepped at its tool holder end to provide a clearance for the cylindrical end 22 of the tool holder shank.

The inner end of the spindle 11 is secured to a tubular extension 32 by threads 33. The spindle extension is slidably and freely received within the housing 37 of the milling machine 12. A portion of the spindle extension protrudes beyond the housing 37 and supports one end of a Belleville or washer spring 38.

The draw bar 27 of the present invention is in the form of an internally stepped elongated tube slidably carried within the through hole 28 of the spindle 11. A tapered portion 34 is formed on the outer surface of the free end of the draw bar with its reduced diameter at the tool holding end of said draw bar. The end of the taper 34 is externally threaded at 39. The threads 39 are of a pitch and form to be received within the threads 25a in the bore 25 of the cylindrical portion 22 of the tool holder. The outside diameter of the threads 39 is smaller than the inside diameter of the threaded bore 25 of the tool holder.

The tapered end of the draw bar 27 is also longitudinally slotted as shown at 30 to form two or more arms 31 in the tapered portion 34. This construction permits the threaded, tapered portion 39 of the draw bar to be urged outwardly after being disposed within the tool holder bore 25.

Coupling of the draw bar 27 with the tool holder is achieved by the operation of an elongated draw bar expander 35 (best shown in FIGS. 1 and 2).

The draw bar expander 35 is substantially rod shaped and slidably disposed within the longitudinal bore of the draw bar 27. The end 36 of the draw bar expander closest to the tool holder 13 extends beyond the draw bar and is formed with an outwardly tapered button 40. The taper of the button 40 is complimentary to a tapered recess 41 in the end of the draw bar 27. As a result, when the draw bar expander 35 is drawn into the draw bar 27, as hereinafter more fully set forth, the button 40 will force the arms 31 of the draw bar 27 apart, bringing the interior and exterior threads 25a, 39 into coupling engagement.

The remainder of the draw bar expander 35 extends beyond the draw bar 27, through the tubular tubular spindle extension 32 and the Belleville spring 38. The end of the draw bar expander 35 is externally threaded at 44a. Upon the threaded end 44a of the draw bar expander and in contact with the belleville spring 38, there is carried an internally threaded collar 44 which is used to adjust the compression on the spring between the collar and the end of the spindle extension 32.

A draw bar actuating air cylinder 60 is secured to a cylinder frame 61 on the top of the milling machine housing 37. The cylinder frame is secured to the housing by means of bolts 46 which are slipped through bores 47. Coil springs 48 carried by each of the bolts yieldably urge cylinder frame 61 against the top of the housing.

A channel shaped support 49 is secured to cylinder frame 61. The support is centrally bored as shown at 50. The bore is aligned with an opening 50a in the cylinder frame. The spindle extension 32 passes through the openings 50, 50a. Upstanding portions 51 of the channel shaped support 49 are each recessed on the inner surfaces thereof to receive one end of coil springs 52. The opposite ends of each of the coil springs extend inwardly toward cams 53. The spaced cams 53 are slidably secured to the channel shaped support 49 by means of a guide 54.

A depending "U" shaped roller bracket 56 is secured at its upper end to a piston rod 64 by means of bolt 68. The roller bracket 56 supports two spaced cam followers 58 (hereinafter "rollers 58") which extend between the legs of said roller bracket 56 in the direction of the cams 53. The cams 53 are formed with inwardly slanting cam faces 59 which are disposed in the path of the rollers 58 as hereinafter more fully described. The inner ends of coil springs 52 are carried within recesses in each of the cams 53 so that the cams are yieldably urged toward each other and in the direction of spindle extension 32.

A source of vertical power such as the air cylinder 60 is carried above the roller brackets 56 by means of the cylinder frame 61. An opening 63 in the top of the cylinder frame 61 is provided to receive the piston rod 64 of the air cylinder 60 therethrough.

It will be noted that the air cylinder frame 61 is resiliently carried on top of the housing 12 by reason of the spring and bolt arrangement 46, 48. This mounting permits the frame vertical freedom after engagement of the cams in the recess 70 in spindle extension 32 during the releasing operation of the power draw bar. Recess 70 is wider than the thickness of the cams. This facilitates entry of the cams into the recess when the spindle is slightly out of position. Vertical freedom of frame 61 allows it to raise until the top of the cams engage the top of recess 70. The frame then acts as a "C" clamp confining the pressure required to compress spring washers 38 to spindle extension 32 and draw bar expander 35.

As best shown in FIG. 1, the draw bar expander 35 is provided with an annular boss 65, a short distance above the end of the spindle 11. The spindle extension 32 above the end of the spindle is provided with an annular recess 66, having a diameter large enough to freely receive the boss 65 and a length great enough to permit the draw bar expander 35 to move vertically therein. A coil spring 67 is carried in a stepped portion 69 around the draw bar expander between the end of the draw bar 27 and the annular boss 65a.

The operation of the power draw bar will become apparent from the above, as follows:

With the power draw bar 10 in the tool eject position as shown in FIG. 1, and with the stop screw 26 within the tool holder 13 properly adjusted, the tool holder 13 is inserted into the spindle 11 until stop screw 26 contacts the end of the draw bar expander button 40. This contact will occur when the tool holder is from 0.030 to 0.045 inches from the spindle taper 18.

Upon a "tool in" command from a computer or switch (not shown), the air cylinder 60 will be activated, causing its piston rod 64 to retract. As the piston rod moves it carries with it the roller bracket 56 which is attached thereto by a bolt 68. The Belleville spring 38 is thereby released and can extend in the direction of the air cylinder 60.

As the Belleville spring 38 extends, it draws the tapered button 36 at the end of the draw bar expander into the tapered socket 41 of the draw bar 27. The arms 31 in the tapered portion of the draw bar are thereby urged outwardly, causing the external threads 39 on the draw bar 27 to engage the internal threads 25a in the tool holder bore 25 to couple the tool holder and draw bar together. It will be observed that the coupling occurs before the draw bar begins to move within the spindle 11, said initial draw bar movement being restrained by the expansion of coil spring 67, carried in the stepped portion 69 of the draw bar expander 35.

The draw bar expander requires only a small amount of travel, of the order of 0.060 inch in order to complete the coupling of the draw bar and the tool holder. At the end of the initial coupling between the draw bar expander and the draw bar, arms 31 are fully expanded and there is no additional outward movement. Both draw bar and expander are then drawn in the direction of the air cylinder 60 by further extension of the Belleville spring, thereby pulling the tool holder 13 securely within the tapered recess 18.

It will be noted from an examination of FIG. 1 that the spindle extension 32 is provided with an annular recess 70 inwardly spaced a short distance from the Belleville spring end thereof. In the tool eject position of the power draw bar, the bases of the cams 53 are disposed within said recess. The purposes of this structure is to reduce the loading on the spindle bearings. As the roller bracket 56 is lifted by the retracting piston rod 64, the rollers 58 engage the cam faces 59, forcing the cams 53 out of the engagement with recess 70. The spindle 11 can then complete its travel and the spindle is free to move up and down without interference from the cams 53, while being rotated by driven gear 71.

In order to eject the tool holder, the operation of the power draw bar is reversed, starting with advancing the air cylinder piston rod and ending with the draw bar expander uncoupling the threads 25a, 39 to release the tool holder.

From the foregoing it will be seen that there has been provided a power draw bar in which coupling is accomplished between the threads on the draw bar and the internal threads of the tool holder without damage to the said threads such as by crossing or excessive wear. Since the draw bar does not spin with respect to the tool holder, the operator's hand will not be injured by a spinning tool. Further danger to the operator is eliminated by reason of the very small upward movement of the tooling (of the order of 0.045 inch), whereas prior art drawbars, particularly of the screw type, raise the tooling ⅜ to ⅝ inch. The above described power draw bar is faster in operation than prior art devices and applies less than 100 pounds of pressure to the spindle bearings.

Having thus fully described the invention, what is desired to be claimed and secured by Letters Patent is:

1. A power draw bar for releasably securing a tool holder within the spindle of a metal cutting machine, said tool holder having a tool receiving chuck at one end and an internally bored and threaded tapered shank at the other end comprising a rigid frame for attachment to the housing of a metal cutting machine, an axially bored elongated spindle rotatably supported within the rigid frame, said spindle being movable along its longitudinal axis in a path normal to said frame, a tapered tool holder receiving recess at one end of the spindle, an elongated axially bored draw bar slidably carried within the spindle bore, an externally threaded tapered portion on said draw bar disposed within the tool holder receiving recess of the spindle, slots in the said draw bar tapered portion defining spaced arms therein, an elongated rod-shaped draw bar expander carried within the draw bar bore and extending beyond each end thereof, a tapered button on the end of the draw bar expander disposed in the path of the tool holder, a complementary tapered portion in the draw bar bore adapted to receive the tapered button, a spring carried by the draw bar expander adjacent the end opposite the tapered button, a spring biasing member on the said expander, said spring being located between the end of the spindle and the spring biasing member, a power source carried by the rigid frame, a driven piston rod in said power source operably engagable with the draw bar expander to longitudinally move said expander in a first direction for tool holder ejection and also release the said expander for movement by the spring in an opposite direction for tool holder engagement with the spindle, and means carried by the rigid frame to limit the travel of the spindle in the direction of the tool holder during tool ejection.

2. A power draw bar according to claim 1 in which the rigid frame is yieldably secured by spring mounting to the housing.

3. A power draw bar according to claim 1 in which the spindle is coupled to a tubular extender having its free end received within a bore in the rigid frame.

4. A power draw bar according to claim 1 in which the tool holder recess is formed with a cylindrical portion to receive the end of the tool holder shank.

5. A power draw bar according to claim 3 in which the tubular extender free end is formed with an annular recess to yieldably receive spaced spring loaded cams.

6. A power draw bar according to claim 5 in which the cams are slidably carried by the rigid frame.

7. A power draw bar according to claim 6 in which the power source is an air cylinder having a piston rod with its free end axially aligned with the draw bar expander.

8. A power draw bar according to claim 7 in which the power source is secured to the rigid frame, said frame having a bore to receive the piston rod therethrough.

9. A power draw bar according to claim 8 in which spaced rollers engagable by the cams are carried by a roller bracket secured to the free end of the piston rod.

10. A power draw bar according to claim 9 in which the spring is a Belleville spring carried upon the draw bar expander and compressed between the spindle extender and the spring biasing member.

11. A power draw bar according to claim 9 in which spring means carried by the draw bar expander and between the said expander and the draw bar restrains the longitudinal movement of the draw bar during the initial movement of the draw bar expander.

* * * * *